Patented Mar. 12, 1935

1,993,736

UNITED STATES PATENT OFFICE 1,993,736

ESTERS AND PROCESS FOR PRODUCING THEM

George De Witt Graves and Walter Eastby Lawson, Wilmington, Del., assignors to E. I. du Pont de Nemours & Company, Wilmington, Del., a corporation of Delaware No Drawing. Application June 10, 1931, Serial No. 543,386

17 Claims. (Cl. 260—103)

This invention relates to new organic acid esters and their preparation. More specifically the invention pertains to novel organic polybasic carboxylic acid esters containing an esterified higher alkyl group.

It is an object of the invention to obtain esters of polybasic acids in which one or more of the carboxylic acid hydrogen atoms are replaced by a normal saturated aliphatic radical containing from six to fifteen carbon atoms.

The invention contemplates within its scope esters of any of the organic polybasic carboxylic acids whether belonging to the aromatic or aliphatic series. One or more of the carboxylic acid hydrogen atoms is replaced by a normal saturated aliphatic radical containing from six to fifteen carbon atoms corresponding to the following list of alcohols:

n-hexyl—$C_6H_{13}OH$
n-heptyl—$C_7H_{15}OH$
n-octyl—$C_8H_{17}OH$
n-nonyl—$C_9H_{19}OH$
n-decyl—$C_{10}H_{21}OH$
n-undecyl—$C_{11}H_{23}OH$
Lauryl—$C_{12}H_{25}OH$
n-tridecyl—$C_{13}H_{27}OH$
Myristyl—$C_{14}H_{29}OH$
n-pentadecyl—$C_{15}H_{31}OH$ The esters may contain only one of the above listed alkyl groups, and may contain a free carboxylic acid group. Alternatively, an ester containing one normal saturated aliphatic group having six to fifteen carbon atoms, may have another carboxylic acid group esterified with any other alcohol. The invention also includes esters of polycarboxylic acids in which more than one acid hydrogen is replaced with a normal saturated aliphatic group having from six to fifteen carbon atoms. Accordingly, the invention covers neutral esters of organic polycarboxylic acids in which all of the carboxylic acid groups are esterified, such esters containing one or more of the alkyl groups listed above.

The following examples illustrate the mode of preparation of the novel esters:

Example 1—Dilauryl adipate

A mixture of 372 grams (2 moles) of lauryl alcohol and 146 grams (1 mole) of adipic acid was heated at atmospheric pressure at a temperature of 195–220° C. for 12 hours. The mixture was then heated under a pressure of 20 mm. of mercury in order to distill off any unchanged alcohols. Practically nothing was removed. The product had a saponification number of 220 compared to the theoretical value of 232 for dilauryl adipate.

Example 2—Dilauryl succinate

A mixture of 59 grams of succinic acid and 231 grams of lauryl alcohol was heated under atmospheric pressure at 210–240° C. for 8 hours. The excess lauryl alcohol was then distilled in vacuum leaving a residue of dilauryl succinate which had a saponification number of 238 compared to the theoretical value of 246.

Example 3—Dilauryl phthalate

A mixture of 100 grams of lauryl alcohol, 40 grams of phthalic anhydride and 23 grams of toluol were heated at atmospheric pressure in an apparatus so designed that the water and toluol would boil off and the toluol layer, separated from the water layer, would return to the flask. The temperature was fixed by the boiling point of the water toluol binary mixture until all of the water was driven off. After boiling for 17 hours the toluol was all distilled off and the material remaining was heated at 200° C. for 30 minutes. When cool it was a light brown oil of low viscosity having an acid number of 11.3.

Example 4—Dilauryl phthalate

A mixture of 298 grams of lauryl alcohol and 118 grams of phthalic anhydride was heated at 200–245° C. at atmospheric pressure for 4 hours, then 50 grams more of lauryl alcohol was added and the heating was continued for 14 hours. The excess lauryl alcohol was then distilled off in vacuum and the residue showed an acid number of 1.3 and a saponification number of 223 compared to theoretical values of 0 and 223, respectively.

Example 5—Mixed alcohols esterified with phthalic anhydride

A mixture of primary saturated straight chain aliphatic alcohols containing those members of the series which contain even numbers of carbon atoms from $C_6$ to $C_{18}$ inclusive was available from the catalytic hydrogenation of coconut oil acids. A mixture of 1418 grams of this alcoholic product and 320 grams of phthalic anhydride was heated under atmospheric pressure in a closed kettle fitted with a reflux condenser kept at the temperature of steam for 11 hours. The temperature in the kettle was 225° C. The product was then removed and heated with 30 grams of bone black at 225° C. for two hours while a current of carbon dioxide was passed through the liquid. It was then cooled and filtered. The product was a dark brown oil of low viscosity having an acid number of 4.1. It doubtless contained the neutral esters of phthalic acid containing the various alcohols in all possible combinations.

*Example 6—Lauryl butyl adipate*

A mixture of 26 grams of dibutyl adipate and 19.5 grams of lauryl alcohol were heated at atmospheric pressure and at temperature of from 117°–150° C. to effect ester interchange. A distillate amounting to 7.5 grams, boiling from 117°–120° C. was taken off. At the end of the esterfication reaction, the temperature was raised to 190° C. and the pressure reduced to 4 mm. to remove lower boiling components of the reaction mixture. Its odor and boiling range showed it to be butanol. The residue was a yellow material solidifying at from 20–25° C. Its acid number was 10.6 and its saponification number 293.7. The calculated saponification number for butyl lauryl adipate is 303.

*Example 7—Trilauryl citrate*

A mixture of 19 grams of Eastman citric acid and 61 grams of 96% lauryl alcohol were heated at atmospheric pressure at 200–230° C. for 17 hours. A stream of carbon dioxide was passed through the liquid to carry off water during this period. The crude product was vacuum distilled to 250° C. at 20 mm. to remove unchanged lauryl alcohol. This product was a yellow oil solidifying at 26° C. Its saponification number was 237.1 compared to a calculated value of 239.

*Example 8—Monolauryl phthalate*

Fifty grams of phthalic anhydride (⅓ mol), 75 grams of crude lauryl alcohol (containing ⅓ mol of pure lauryl alcohol per 75 g. of pure lauryl alcohol), and 100 grams of benzene were heated under reflux overnight on the steam bath. The product was filtered and distilled free from benzene. The residue showed a saponification number of 304.6 and an acid number of 136.5, as against calculated values of 334 and 167, respectively. The monolauryl phthalate was a white solid melting at about room temperature.

The polybasic acids which may be esterfied to yield novel esters of the character described may contain two or more carboxylic acid groups. The following organic acids are named as typical of those which may be used: orthophthalic, terephthalic, oxalic, succinic, adipic, maleic, fumaric, tartaric, malic, citric, quinolinic, trimesic, pyromellitic, naphthalic, naphthalene tetracarboxylic, tricarballylic, hexahydrophthalic, hydroxy phthalic, uvitic and tetrachlorophthalic.

The esters comprising the subject matter of this invention are preferably made by bringing together the desired alcohols and acids (or where the anhydride of the polybasic acid is available it may be used in lieu of the acid) and then heating the mixture preferably at temperatures above 100° C. so that the water produced by the esterfication will boil off and thus permit the reaction to go to completion. The removal of this water may be assisted by adding to the esterfication mixture a carrier liquid such as benzene or toluene which will distill out with the water at a temperature below 100° C., in which case the esterfication may be carried on at a lower temperature than would otherwise be used. An inert gas such as carbon dioxide may be continuously passed through the reacting mixture to accomplish the same purpose, namely, facilitate removal of water.

If desired, small amounts of such catalysts as sulfuric acid or paratoluene sulfonic acid may be added, one per cent or a somewhat less amount of such catalyst being adequate; or metallic sodium may be present during the reaction.

The theoretical quantities of acid and alcohol may be used for the esterfication that is to say, where the monoester is desired, one mole of acid and one mole of alcohol may be used e. g., one mole of phthalic acid and one mole of lauric alcohol may be reacted to form monolauryl phthalate; where a diester is desired, one mole of acid and two moles of alcohol may be used, e. g., one mole of phthalic acid and two moles of lauryl alcohol may be reacted to form dilauryl phthalate; where a mixed ester is desired, one mole of acid, one mole of one alcohol and one mole of another alcohol may be used, e. g., one mole of phthalic acid, one mole of lauryl alcohol, and one mole of butyl or hexyl alcohol may be reacted to form lauryl butyl or lauryl hexyl phthalate. If desired, an excess of alcohol or acid may be used, the excess being removed from the formed ester by any convenient method, e. g., distillation.

A method of esterification by means of ester interchange is exemplified in Example 6. In this method an ester of the acid to be esterified with a volatile alcohol is heated with the alcohol to be esterified together with an ester interchange catalyst, such as sulfuric acid, hydrochloric acid, sodium butylate, etc. In the process of ester interchange the volatile alcohol is distilled off, the residue consisting of the ester of the acid together with the less volatile alcohol. This process may be carried out in connection with a fractionation, the volatile alcohol being distilled out, the less volatile alcohol being returned to the esterification mixture.

Ordinarily, the esterification reaction takes place at atmospheric pressure. However, any desired pressure may be used since pressure does not greatly influence the reaction when higher boiling materials are used, reduced pressures are sometimes preferable.

The novel esters of this invention have considerable utility in the arts. They are especially useful as softeners for pyroxylin and other cellulosic plastic compositions. They are water resistant, and of low volatility, yielding very stable films and exerting a permanent softening influence when used in conjunction with nitrocellulosic and similar plastic cellulosic derivatives.

The above description and examples are to be taken as illustrative only and as not limiting the scope of the invention. Any variation or departure therefrom which conforms to the spirit of the invention is intended to be included within the scope of the claims.

We claim:

1. An ester of an organic polycarboxylic acid, at least one acid hydrogen of which has been replaced by the lauryl radical.

2. An ester of an organic polycarboxylic acid, at least one acid hydrogen of which has been replaced by the lauryl radical and another acid hydrogen atom of which has been replaced by an alcohol radical.

3. An ester of an organic dicarboxylic acid, each acid hydrogen atom of which has been replaced by the lauryl radical.

4. A mixture of esters having a composition substantially identical with the mixture of esters obtained by the esterification of an organic polycarboxylic acid and a mixture of alcohols obtained by the catalytic hydrogenation of cocoanut. oil acids and predominating in lauryl alcohol.

5. A mixture of esters having a composition substantially identical with the mixture of esters obtained by the esterification of an organic dicarboxylic acid and a mixture of alcohols obtained by the catalytic hydrogenation of cocoanut. oil acids and predominating in lauryl alcohol.

6. A mixture of esters as defined in claim 5, in which at least one acid hydrogen of the organic dicarboxylic acid has been esterified by the mixture of alcohols.

7. A mixture of esters as defined in claim 5, in which one acid hydrogen of the organic dicarboxylic acid has been esterified by the mixture of alcohols and the other acid hydrogen of which has been esterified by another alcohol.

8. A mixture of esters as defined in claim 5, in which these esters are neutral esters.

9. A mixture of esters having a composition substantially identical with the mixture of esters obtained by the esterification of an acid selected from the group consisting of phthalic acid, succinic acid and adipic acid, and a mixture of alcohols obtained by the catalytic hydrogenation of cocoanut oil acids and predominating in lauryl alcohol.

10. A mixture of esters as defined in claim 9, in which at least one hydrogen of the acid has been esterified by the mixture of alcohols.

11. A mixture of esters as defined in claim 9, in which the mixture of esters are neutral esters.

12. A mixture of esters having a composition substantially identical with the mixture of esters obtained by the esterification of phthalic acid and a mixture of alcohols obtained by the catalytic hydrogenation of cocoanut oil acids and predominating in lauryl alcohol.

13. A mixture of neutral esters having a composition substantially identical with the mixture of neutral esters obtained by the esterification of phthalic acid and a mixture of alcohols obtained by the catalytic hydrogenation of cocoanut oil acids and predominating in lauryl alcohol.

14. A lauryl phthalate.
15. Dilauryl phthalate.
16. A lauryl adipate.
17. Dilauryl adipate.

GEORGE DE WITT GRAVES.
WALTER EASTBY LAWSON.